G. HUTCHINSON.
CUTTING OR PRESSING TOOL.
APPLICATION FILED APR. 15, 1918.
1,298,951.
Patented Apr. 1, 1919.
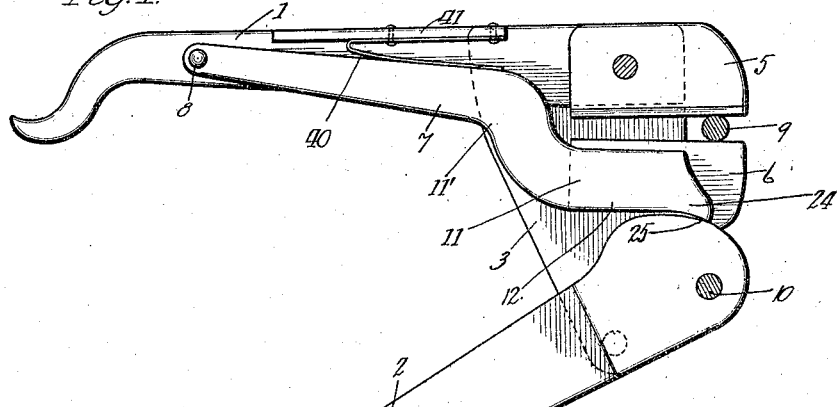
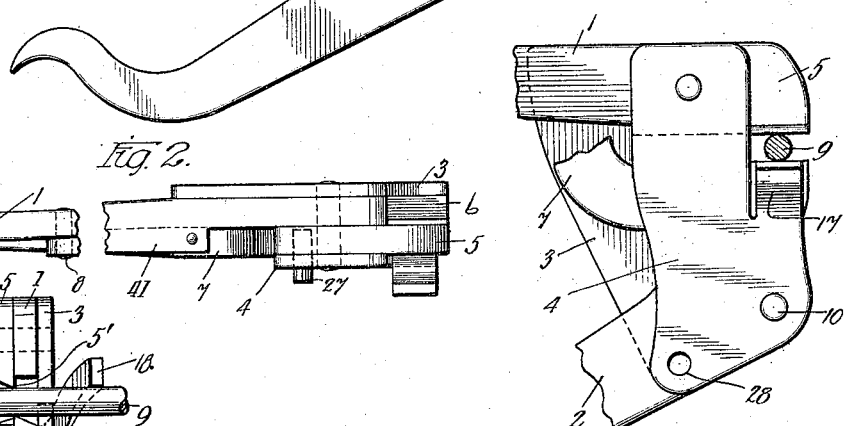
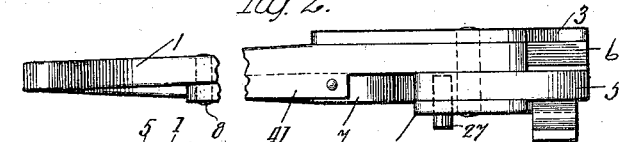
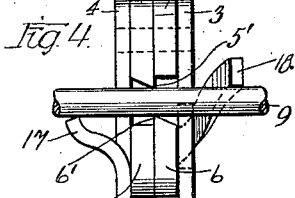
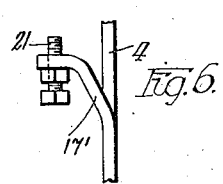
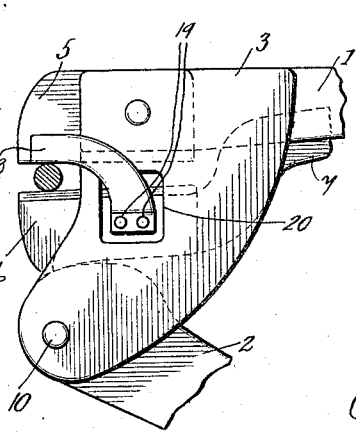
Witnesses:
Arthur W. Carlson
Robert H. Weir
Inventor
George Hutchinson
Bingley
atty.

UNITED STATES PATENT OFFICE.

GEORGE HUTCHINSON, OF CHICAGO, ILLINOIS.

CUTTING OR PRESSING TOOL.

1,298,951.  Specification of Letters Patent.  Patented Apr. 1, 1919.

Application filed April 15, 1918. Serial No. 228,768.

*To all whom it may concern:*

Be it known that I, GEORGE HUTCHINSON, of 143 West Austin avenue, city of Chicago, in the county of Cook, State of Illinois, United States of America, have invented new and useful Improvements in Cutting or Pressing Tools, of which the following is a specification.

This invention relates to improvements in cutting or pressing tools and is illustrated and described, by way of example, with reference to a hand operated wire cutter or bolt cutter, although it is obvious that it may, with slight modifications, be employed as a punching tool, a riveting tool, pliers, or the like. The adaptation of the tool to the various uses may be effected by varying the shape of the operative portions or jaws thereof, while the means for actuating these jaws may remain for different uses as described herein.

The object of the invention is to produce a tool of the class referred to, which may be operated with great facility and efficiency.

Another object is to combine with a tool of this character means for holding the work in proper position while being subject to the operations by the tool.

Several embodiments of the invention are illustrated in the accompanying drawing.

Figure 1 is a side elevation of the tool, shown as a hand-operated wire cutter, one of the straps for supporting the handles of the tool being shown omitted and the pivots being shown in section.

Fig. 2 is a top plan view.

Fig. 3 is a side elevation of the front portion of the tool similar to Fig. 1, but illustrating the strap and holding portion for the work.

Fig. 4 is a front elevation.

Fig. 5 is a side elevation showing the front portion of the tool from the side opposite to that in which it is shown in Fig. 3.

Fig. 6 shows a modified adjustable holding portion for the work.

The tool comprises two handles 1 and 2, of which the last named handle is referred to as the movable handle while the first named handle 1 is a stationary element and is designated as one of the carriers of an operative element. The front portions of these handles are united by means of lateral straps 3 and 4 respectively, the straps 3 and 4 being immovably secured to the stationary handle 1 while the movable handle 2 is pivotally mounted by means of the pivot 10 in both of said straps. The rear end of this movable member may be swung toward and away from the rear end of the stationary handle 1. The stationary handle 1 carries near its front portion and firmly secured thereto by means of spot welding or in some other suitable way, a jaw 5 having a shearing or cutting edge 5' of suitable configuration, preferably at a slight distance below the front portion of the stationary handle 1 and projecting also, as may be seen from Fig. 1 forwardly, beyond the front portion of said handle and beyond the front edge of the straps 3 and 4.

This cutting jaw 5 constitutes one of the tool elements of the device. The companion element 6, also constructed as a cutting jaw or the like, is firmly secured to the front portion of an intermediary lever 7, which is pivoted by means of the pin 8 to the stationary handle 1 in a point at a relatively large distance from the operative jaw 5. The bodies of the jaws 5 and 6 are located in different planes, as may be seen from Fig. 4, their cutting edges 5', 6', however, being placed in a single plane which is vertical to the axis of the work 9 to be cut. Owing to the provision of the straps 3 and 4 firmly supported at opposite sides of the coöperating tool elements 5 and 6, a lateral displacement of the cutting edges 5', 6' of these operative elements is made impossible.

As will be seen from Fig. 1, the main portion of the lever 7 extends to a point near the rear portion of the handle 1 and is straight. A knee 11' is formed near the front end of the member 7, and from this knee a portion 11 extends downwardly and forwardly so as to hold, either by spot welding or in some other suitable way, the jaw 6. The lower or inoperative surface of the cutting element 6 and the lower surface of the front portion of the lever 7 are slightly concaved (as seen in side view in Fig. 1) and these surface portions are flush with each other so as to present a single slightly concaved surface for engagement by a cam portion 25, which is disposed at the front of the handle 2. This cam portion is formed eccentrically with respect to the pivot 10 on which the handle 2 is supported between the straps 3 and 4 of the tool.

As may be seen from Fig. 4, the jaw 5, attached to the handle 1, is in direct opposition to the lever 7 while the operative element 6, attached to said lever 7, is in direct opposition to the handle 1.

Owing to this construction the cutting edges 5' and 6' of the tool elements 5 and 6 are held in vertical registration with respect to each other. It will also be seen that the cutting edges of the tool elements project somewhat below and above respectively, the lower and upper edges of the carrier members 1 and 7, respectively. If therefore, upon operation of the movable handle 2, the front portion of the lever 7 is advanced in direction toward the stationary tool element 5, the cutting edges 5', 6' may be brought into overlapping relation so as to effect a smooth and even shearing on the work 9.

In the shearing operation the work 9 would have a tendency to force the movable tool element 6 laterally away from the other element 5. This tendency is overcome by the straps 3 and 4 which not only serve as supports for the movable handle 2, but also as guides for the movable jaw 6, the strap 3 being preferably welded or in some other suitable way firmly connected with the side surface of the stationary handle 1, while the strap 4, at the other side of the implement, may be made removable in any desired way. This arrangement will make it possible to regrind or repair in other ways either or both of the tool elements 5 and 6.

In the shearing operation the work has a tendency to be deformed at both sides of the cut, which tendency would find expression, as seen, for instance, in Fig. 4, by bending the portion at the right side of the cut upward while the portion at the left side of the shearing cut would be forced downward. Means are provided in connection with the tool for preventing this bending or crimping of the work, and these means are formed by lugs 17 and 18 projecting from the side surface of the straps 3 and 4.

As may be seen in Figs. 2, 3, and 4 the strap 4, which, for the purpose of the present description may be designated as the front strap, has a lug 17 cut from the body of the strap and bent laterally, forming a support for the work 9 and preventing a downward deflection of this portion of the work. A lug 18 is also firmly connected with the jaw 6, as may be seen from Fig. 5, by means of rivets 19 or the like. For the purpose of enabling said holding lug 18 to move together with the operative element 6 the strap 3, adjacent and with respect to which said jaw is moved, is provided with a window or opening 20 of suitable size and through which the rear portion of the lug 18 projects.

In the modification illustrated in Fig. 6, the strap 4 is provided with a lug 17', which, at its free end, is bent horizontally and serves for receiving a set screw 21, forming an adjustable stop to prevent deflection of that portion of the work and permitting at the same time adjustment of this holding member corresponding to the thickness of the material to be treated.

As may be seen from Figs. 1 and 5, the strap 3 has approximately triangular shape, the base of the triangle being flush with the top edge of the carrier 1 and extending over a relatively large distance thereof. The lower end or apex of this triangular strap projects forwardly and carries in its forward portion the pivot pin 10, which is about directly under those points of the jaws 5 and 6 on which the shearing operation takes place. This arrangement provides for a long lever arm of the movable handle 2 and serves to provide the leverage for performing the shearing operation. It will also be noted from Figs. 1 and 5 that the point of engagement between the cam 25 and the combined surface portions of the movable jaw 6 and the lever 7 is almost directly underneath the point at which the cutting operation is to be performed, also resulting in a reduction of the necessary force for cutting the material.

For the purpose of depressing the intermediate cam-actuated member or lever 7 and thereby automatically opening the jaws, after the completion of each operation, a spring 40 may be inserted between said lever 7 and a flange 41, projecting laterally from the top edge of the stationary handle 1, as indicated in Figs. 1 and 2.

When it is desired to operate the tool with both hands, the distance at the rear end of the two handle members 1 and 2 may be as wide as illustrated in Fig. 1. If it should be desired, however, to permit operation with one hand only a stop pin 27 may be inserted into an opening 28 which is provided in the strap 4, the inner end of said pin projecting then below the lower edge of the front portion of the movable handle 2, as shown in dotted lines in Fig. 4, and preventing thereby the excessive opening of the movable handle.

I claim:

1. In a device of the character described, the combination of coöperating tool elements in opposition to each other, a handle and a lever respectively for said tool elements, said lever being pivoted to the handle at a distance from the tool elements, guiding straps secured to the handle and between which the lever and the tool element combined therewith are guided, an actuating handle for said lever and pertaining tool element, said second handle being movable between said straps and guided thereby, and lug portions projecting laterally from the planes of said straps and adapted to prevent bending of the work in predetermined direction while said tool elements are operating on the same.

2. In a device of the character described, the combination of a stationary handle, a tool element attached thereto, guiding straps at both sides of said combined handle and tool element, a second handle movable between said guiding straps, an intermediate lever pivoted to said first named handle at a distance from said tool element, a second tool element carried by said intermediate lever, said second handle being adapted to actuate said combined intermediate lever and pertaining tool element, a lug projecting from one of said straps laterally, and another lug firmly attached to said movable tool element and projecting beyond the plane of the adjacent strap.

3. In a device of the character described, the combination of a stationary handle, a tool element firmly secured thereto on one side thereof, a strap firmly attached thereto at the other side thereof, another strap detachably secured to the other side of said tool element, a second handle pivoted between said straps, an intermediate lever pivoted to said first named handle at a distance from the tool element, a companion tool element carried by said intermediate lever, said combined intermediate lever and tool element being guided between said straps a lug projecting laterally from the second strap below the axis of the work to be operated on, and a second lug firmly secured to the movable tool element, the first named strap having an opening through which said second lug projects, and said second lug being placed to project over the body of the work.

4. In a device of the character described, the combination of a handle, a tool element firmly attached thereto on one side thereof, a pair of straps attached to opposite sides of said handle and tool element, a second handle pivoted in said straps, an intermediate lever pivoted at a distance from said tool element to the first named handle, a companion tool element mounted on said pivoted lever, said second handle being provided with a portion adapted to actuate said intermediate lever and companion tool element, and a pin insertible in one of said straps adapted to project below the second handle for limiting swinging movement of said pivoted handle in a predetermined direction.

In witness whereof I affix my signature.
GEORGE HUTCHINSON.

Copies of this patent may be obtained for five cents each, by addressing the "Commissioner of Patents, Washington, D. C."